United States Patent
Chan et al.

(10) Patent No.: US 7,359,405 B2
(45) Date of Patent: Apr. 15, 2008

(54) BURST TRANSFER MECHANISM OF NETWORK PACKETS HAVING MAC FRAMES OVER USB BUS

(75) Inventors: Yung-Ta Chan, Hsinchu (TW); Hsun-Yao Jan, Hsinchu (TW); Ming-Hui Su, Hsinchu (TW); Chi-Hsiang Wang, Hsinchu (TW)

(73) Assignee: Asix Electronics Corporation Ltd., Hsinchu (TW)

( * ) Notice: Subject to any disclaimer, the term of this patent is extended or adjusted under 35 U.S.C. 154(b) by 864 days.

(21) Appl. No.: 10/686,562

(22) Filed: Oct. 17, 2003

(65) Prior Publication Data
US 2005/0083968 A1    Apr. 21, 2005

(51) Int. Cl.
*H04J 3/24* (2006.01)
(52) U.S. Cl. ...................................... 370/474
(58) Field of Classification Search ................ 370/466, 370/464, 465, 474, 476
See application file for complete search history.

(56) References Cited

U.S. PATENT DOCUMENTS

| | | | | |
|---|---|---|---|---|
| 6,222,823 B1* | 4/2001 | Smith et al. | ................. | 370/230 |
| 6,898,654 B1* | 5/2005 | Senior et al. | ................. | 710/305 |
| 7,003,638 B2* | 2/2006 | Brant et al. | .................. | 711/154 |
| 2002/0184394 A1* | 12/2002 | Athanas et al. | ............. | 709/250 |
| 2003/0063569 A1* | 4/2003 | Kalliokulju et al. | ........ | 370/252 |

OTHER PUBLICATIONS

Jorgensen, Jacob and Chao-Chun Wang, "MAC Layer Proposal with IP QoS Allowances for BWA," IEEE 802.16 Broadband Wireless Access Working Group, Oct. 29, 1999.*

* cited by examiner

*Primary Examiner*—Ajit Patel
(74) *Attorney, Agent, or Firm*—Bacon & Thomas, PLLC

(57) ABSTRACT

The present invention is to provide a burst transfer mechanism of network packets having MAC frames over USB bus, which is designed in an Application Specific Integrated Circuit (ASIC) being installed in a USB compliant networking device, enabling the networking device to assemble a plurality of Ethernet network packets having MAC frames together as a super-size network packet and, while receiving a Bulk In/Out request packet, transfer the super-size network packet into a plurality of USB packets having maximum packet size defined for the USB endpoint, and transmit the USB packets out within a burst cycle of Bulk In/Out transaction, in order to greatly improve and enhance the throughput performance of the network packets over USB bus.

4 Claims, 5 Drawing Sheets

BURST TRANSFER MECHANISM OF NETWORK PACKETS HAVING MAC FRAMES OVER USB BUS

FIELD OF THE INVENTION

The present invention relates to a transfer mechanism of network packets, more particularly relates to a burst transfer mechanism designed in an Application Specific Integrated Circuit (ASIC) installed in a networking device compliant to USB interface specification and capable of transmitting and receiving native network packets having Ethernet MAC frames over the USB bus for improving and maximizing the overall throughput performance of Bulk In/Out transaction

BACKGROUND OF THE INVENTION

Various peripherals such as printers, scanners, card readers, camcoders, network hubs, digital cameras, etc. have been commercially available as information technology has known a rapid and spectacular development in recent years. Such peripherals not only increase the performance of computer but also enable a user to perform tasks that are not possible in the past by utilizing the computer and the associated peripherals. For instance, video conference through the Internet, editing digital images taken by a digital camera or camcoder, or the like is effected. This can greatly increase the convenience and popularity of information products among consumers. However, installations of the peripherals can cause trouble to a user. Typically, a computer must be shut down prior to installing a desired peripheral in the computer. Next, connect the peripheral to an input/output (I/O) port at a rear of the computer. Then turn on the computer to install an associated driver. After installation, reset the computer to activate the peripheral for operating in cooperating with the computer. In view of this, the installation processes of the peripherals are tedious and don't provide a Plug and Play feature thereon. Only a few I/O ports of the computer also limits the number of peripherals that can be coupled to the computer. As a result, a performance of computer cannot increase as expected.

For solving this problem, seven major computer and/or telecommunication companies developed a rule of USB interface specifications recently. It is envisaged that faster signal transmission rate, Plug and Play (i.e., more convenient), and enhanced expansion capability of electronic products can be carried out by the rule of USB interface specifications. In general, a computer complied with the USB interface specifications can only provide two USB ports each capable of coupling to 127 peripherals via an external Ethernet adaptor. Moreover, it is allowed to add or delete any peripheral depending on applications. Further, no driver installation or repeated resetting of computer is required. Hence, an installation process of peripheral becomes more user friendly.

For instance, an electronic product complied with the USB interface specifications is shown as an Ethernet adaptor 10 in FIGS. 1 and 4. The Ethernet adaptor 10 comprises an Application Specific Integrated Circuit (hereinafter abbreviated as ASIC) 13, Flash RAM 15 and other necessary electronic components and circuits, wherein the ASIC 13 comprises at least a USB device controller 11, a microprocessor 12 and a plurality of memory components (e.g., static random access memories, abbreviated as SRAMs) 14. As shown in FIG. 2, when the Ethernet adaptor 10 is coupled to a USB port (not shown) of a client host 20 through a USB connecting line 21 and, at the same time, connected to a Ethernet Local Area Network 30 via a network connecting line 16, the USB device controller 11 acts to transmit or receive USB packets between the client host 20 and the Ethernet adaptor 10 in order to transform USB packets received through USB interface into network packets having Ethernet MAC frames and then transmit the same to the Ethernet Local Area Network 30, or transform network packets with Ethernet MAC frames received from the Ethernet Local Area Network 30 into USB packets and then transmit the same through USB interface to the client host 20. The microprocessor 12 acts to control all the electronic components being operated in normal situations during transmitting or receiving the USB packets. The memory components (e.g., SRAMs) 14 act to store USB interface programs. Further, other memory components (e.g., flash RAMs 15) act to store intermediate data created in the operations. As a result, a task of transmitting or receiving the USB packets assigned by the client host 20 can be achieved by the Ethernet adaptor 10.

Typically, an Ethernet network interface complied with the USB interface specifications is also installed in the client host 20, which comprises an ASIC 13 (having at least a USB device controller 11 and a microprocessor 12) and other necessary electronic components and circuits (not shown), in order to transform network packets having Ethernet MAC frames produced by a network software 24 installed in the client host 20 into USB packets and then transmit the same through USB interface to the Ethernet adaptor 10, or transform USB packets received from the Ethernet adaptor 10 into network packets having Ethernet MAC frames.

Since all the network packets transmitted within the above-mentioned conventional Ethernet adaptor 10 and the client host 20 are through the USB interface, the ASIC 13 of the Ethernet adaptor 10 has to be designed with a special mechanism for packet processing according to a well-known implementation mentioned in "Section 3.8 USB Networking Models" in "Universal Serial Bus Class Definitions for Communication Devices" standard, which allows any type of Ethernet adaptors 10 complied with the USB interface specifications to transmit network packets with the client host 20 through the endpoints defined by them according to the USB interface specification (the so-called logical communication pipe), and also enables the Ethernet adaptors 10 or client host 20 to describe the beginning and ending of a segment within the data stream delivered by the endpoint thereof.

In general, when the conventional Ethernet adaptor 10 transmits or receives network packets having Ethernet MAC frames (hereinafter referred as network packets in order to distinguish from the USB packets) over USB interface (bus), the Ethernet adaptor 10 utilizes an USB short packet mechanism to encapsulate the network packets transmitted through the USB bus between the client host 20 and Ethernet adaptor, and delineate the segment of the network packets in order to complete the transferring between the network packets and USB packets. During the procedure of transferring, as shown in FIG. 3, when a segment of network packet is transferred into N USB packets, if the first USB packet through the N-1st USB packet are all in the maximum packet size defined for the USB endpoint and the Nth packet is in a size less than the maximum packet size, the Ethernet adaptor 10 will generate a short packet to identify the end of the segment while transmitting packets through the USB interface. Otherwise, if the Nth packet is in a size exactly the maximum packet size, a zero-length packet shall be added behind the Nth packet as a short packet to assure the end of segment being properly identified.

FIG. 4 shows a Network packet having Ethernet MAC frames as an example, when a client host 20 intends to transmit the network packet to a Ethernet adaptor 10 through the USB interface, a USB driver 25 installed in the client host 20 has to execute an appropriate encapsulation with respect to the network packets, and then generate and transmit a short packet to the Ethernet adaptor 10. Hence, during Bulk Out/In Transactions, the client host 20 shall have the ability to write a zero-length packet into a buffer in order to generate a short packet while transferring the network packet into a plurality of USB packets having the maximum packet size defined for the USB endpoint. Besides, with respect to the client host 20, the size of the segment in network packet is negotiable while the network packet being transferred into USB packets. Typically, a Network packet (not including the CRC) are 1514 byte or less in length, which could be much longer in other communication protocol, e.g. 802.1Q VLAN tagging. In general, within the network packet, the whole data between the Ethernet destination address (DA) up to the end of the data field belongs to the data being transmitted. As regards the CRC checksum must not be included for either send or receive data, which is generated and checked by the device hardware of the client host 20 or Ethernet adaptor 10 as required for the specific media.

Again referring to FIG. 4, when the client host 20 intends to transmit or receive a network packet over the USB bus, a network software 24 installed therein will generate a Bulk I/O Request Packet (hereinafter abbreviated as Bulk IRP) first, and transmit the Bulk IRP to a USB driver 25, which in turn requests a host controller driver 26 of the client host 20 to start segmenting the network packet into a plurality of Bulk I/O transaction ready for being serialized by a host controller 27. The host controller 27 then transmits the packets to the ASIC 13 of the Ethernet adaptor 10 over the USB bus. As a result, the USB packets received by the ASIC 13 is in turn transferred into network packet having Ethernet MAC fame and then transmitted to the Ethernet Local Area Network 30.

In the above-mentioned network packet processing mechanism, since the network software 24 in the client host 20 would have to transmit an Bulk IRP to the USB driver 25 for each and every network packet having Ethernet MAC frame being transmitted or received regardless of the size thereof, the mechanism can significantly degrade the overall network packet throughput on some low-end host system due to insufficient real-time computing power. Besides, it has to be especially mentioned here that, when a burst of network packets being transmitted, the USB driver 25 will start the processing of a series of queuing Bulk IRP generated by the network software 24 only after the processing of the currently servicing IRP being completed by the USB driver 25. In case the conventional mechanism is applied to a high speed Gigabit Ethernet application, since the network packet transmitting rate of this kind of application is much higher, the one IRP per network packet servicing model can no longer work very well unless a high-end host system with sufficient real-time computing power is used. Therefore, the performance of host system's software driver and the MAC frame burst patterns and its frame size of network packet becomes very critical in determining Ethernet network packet throughput.

SUMMARY OF THE INVENTION

It is therefore an object of the present invention to provide a burst transfer mechanism of network packets having MAC frames over USB bus for effectively improve the throughout performance of the above-mentioned conventional algorithm of processing network packets in a way greatly decreasing the throughout performance of network packets due to the heavy burden of issuing a requesting packet every time after processing each network packet. The burst transfer mechanism of network packets having MAC frames over USB bus, according to the present invention, is designed in an Application Specific Integrated Circuit (ASIC) being installed in a USB compliant networking device, enabling the networking device to assemble a plurality of Ethernet network packets having MAC frames together as a super-size network packet and, while receiving a Bulk In/Out request packet, transfer the super-size network packet into a plurality of USB packets having maximum packet size defined for the USB endpoint, and transmit the USB packets out within a burst cycle of Bulk In/Out transaction, in order to greatly improve and enhance the throughput performance of the network packets over the USB bus.

Another object of the present invention is to provide a burst transfer mechanism enabling software installed in the networking device to issue a Bulk In/Out request packet to a USB driver in response to transmitting the super-size network packet over the USB bus. Thus, it not only effectively avoid the software from issuing a long series of request packets while transmitting Bulk network packets, but also avoids the USB driver from wasting a lot of time due to processing a long series of queuing request packets, and greatly increase the throughput performance of the network packets over the USB bus.

A further object of the present invention is to assemble a plurality of Ethernet network packets having MAC frames together as a super-size network packet, where proprietary Length and Length Bar (inversion of Length value) bytes are sequentially appended to every network packet to delineate the end thereof.

Still another object of the present invention is that, after the USB driver grants the request of the request packet, the burst transfer mechanism proceeds with the capsulation process to the super-size network packet in a way similar to the conventional mechanism, and transfers the super-size network packet into a plurality of USB packets having maximum packet size defined for the USB endpoint along with a short packet. Thus, within a burst cycle of Bulk In/Out transaction, the client host or networking device can transmit the USB packets out in order to greatly improve the throughput performance of the network packets over the USB bus.

The above and other objects, features and advantages of the present invention will become apparent from the following detailed description taken with the accompanying drawings.

DETAILED DESCRIPTION OF THE PREFERRED EMBODIMENTS

Figure 1:
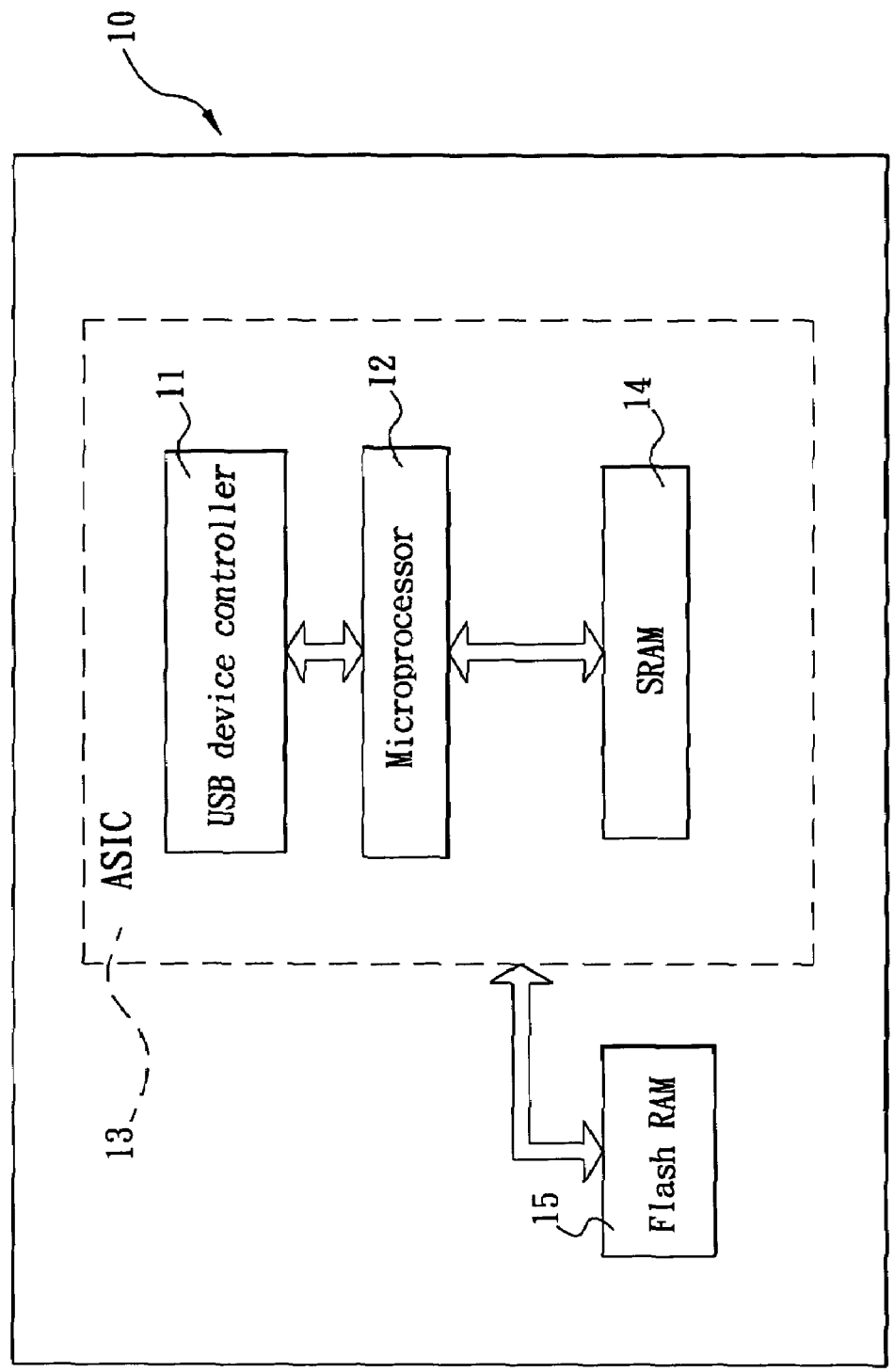
FIG. 1 presents schematically a conventional Ethernet work adaptor complied with the USB interface specifications.
Figure 2:
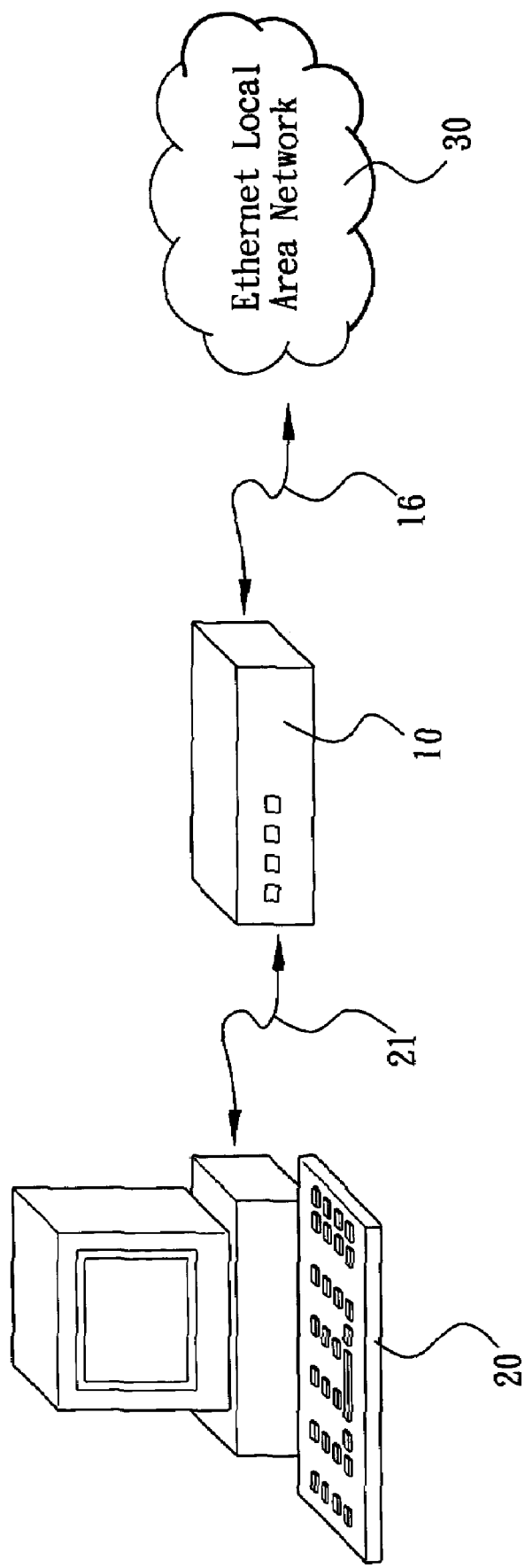
FIG. 2 presents schematically a conventional Ethernet work adaptor complied with the USB interface specifications being connected with a client host and an Ethernet Local Area Network respectively.
Figure 3:
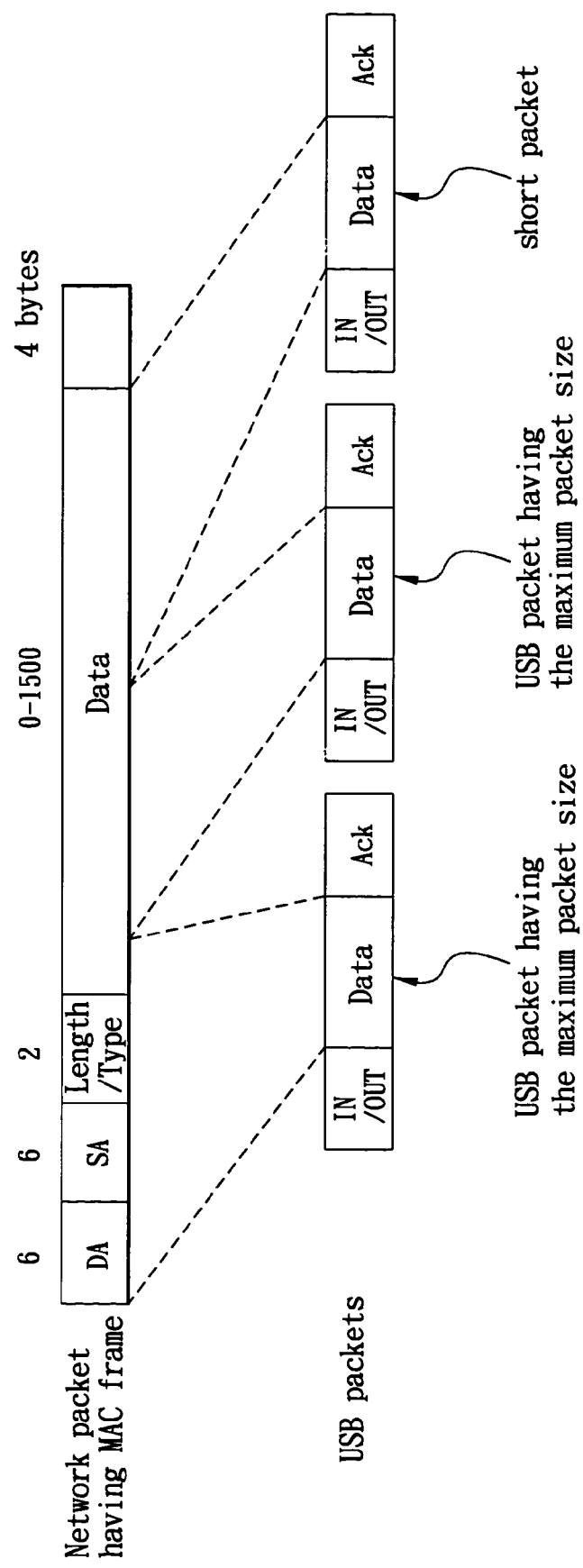
FIG. 3 presents schematically a network packet having MAC frame being transferred into a plurality of USB packets by utilizing the conventional USB short packet processing mechanism.
Figure 4:
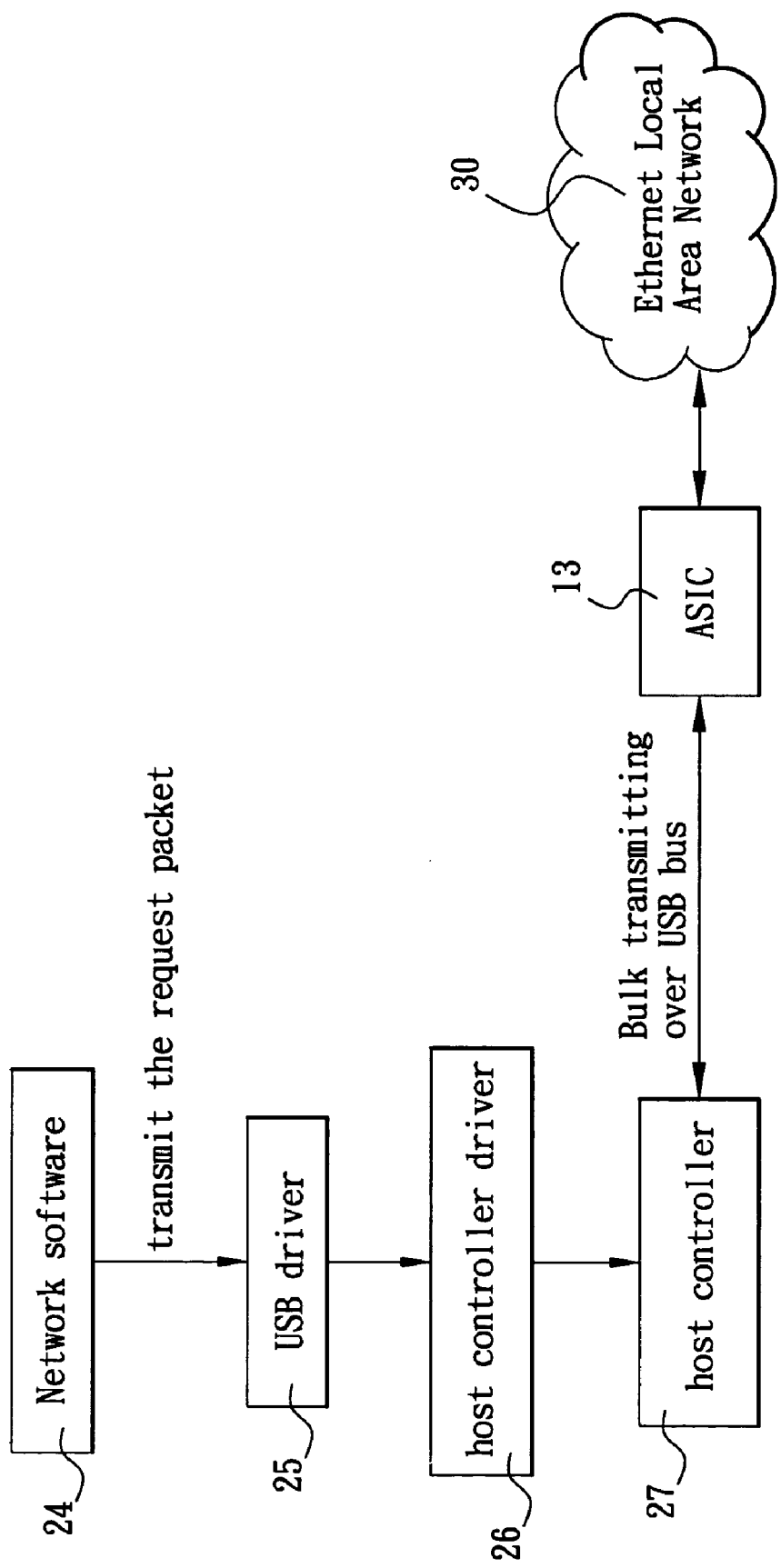
FIG. 4 presents schematically a client host being connected to Ethernet Local Area Network through an ASIC according to the prior art or the present invention.

The present invention relates to a burst transfer mechanism of network packets having MAC frames over USB bus, as referring to FIG. 4, which is designed in an Application Specific Integrated Circuit (hereinafter abbreviated as ASIC) 13 being installed in a USB compliant networking device, enabling the networking device to assemble a plurality of Ethernet network packets having MAC frames together as a super-size network packet and, while receiving a Bulk In/Out request packet, transfer the super-size network packet into a plurality of USB packets having maximum packet size defined for the USB endpoint, and transmit the USB packets out within a burst cycle of Bulk In/Out transaction. The networking devices mentioned in the present invention refer to the devices compliant to USB interface specification and capable of receiving and transmitting network packets, such as a USB compliant Ethernet Adaptor or a USB compliant Ethernet network interface card installed in a client host, through wire or wireless communication.

For instance, when a client host being installed with a USB compliant Ethernet network interface card, i.e. the networking device as mentioned above, intends to transmit network packets having MAC frame over USB bus, a network software 24 installed in the client host generates a Bulk I/O request packet and transmit the same to a USB driver 25, enabling the USB driver 25 to assemble a plurality of Ethernet network packets having MAC frames together and append proprietary bytes to every network packet to delineate the end of each network packet and form a super-size data stream, i.e. a super-size network packet. Thus, when the client host intends to transmit the super-size network packet over USB bus, the network software 24 installed therein merely needs to issue a Bulk I/O request packet to the USB driver 25 in response to the super-size network packet. After the USB driver 25 grants the request of the request packet, the burst transfer mechanism of the present invention proceeds with the capsulation process to the super-size network packet in a way similar to the conventional mechanism, and transfers the super-size network packet into a plurality of USB packets having maximum packet size defined for the USB endpoint along with a short packet. Then, the client host can transfer a plurality of Ethernet network packets having MAC frames into a plurality of USB packets having maximum packet size and transmit them out within a burst cycle of Bulk In/Out transaction, which not only effectively avoids issuing a long series of request packets while transmitting bulk network packets, but also avoids the USB driver 25 from wasting a lot of time due to processing a long series of queuing request packets, and greatly increase the throughput performance of the network packets over the USB bus.

In addition, within a burst cycle of Bulk In/Out transaction, the maximum quantity of the network packets having MAC frames being comprised in a super-size network packet can be predefined in a Burst Credit in a way of bytes quantity or according to the quantity of the network packets having MAC frames currently queuing in the buffer, depending on whichever reaches first.

The following description is to detailedly describe the theory and procedure of the burst transfer mechanism according to the present invention by using an example transmitting two network packets having MAC frames over the USB bus:

First, append proprietary bytes to the end (or beginning) of each of the two network packets for delineating the length and length bar (inversion of Length value) of the corresponding network packets, wherein the length refers to the total quantity of bytes counting from the beginning of the destination address field to the end of data field, and is used to represent the ending position of each MAC frame network packet being received and to delineate the boundary thereof, and then assemble the two network packets each appended with the proprietary bytes together to form a super size network packet.

When the burst transfer mechanism according to the present invention proceeds with the capsulation process with respect to the super size network packet, the processing procedures are different, depending on the network packet being transferred into USB packets is received by the networking device from the Ethernet Local Area Network or transmitted from the networking device, as follows:

(1) When the network packet being transferred into USB packets is received by the networking device from the Ethernet Local Area Network, the mechanism comprises the steps of:

(1-1) The networking device mentioned in the following steps may be an Ethernet network adaptor compliant to USB interface specification. At the beginning, the networking device needs to initialize the Burst Credit to "B" value, where "B" is the maximum quantity of bytes of the network packet having MAC frame, which is allowed to transmit or receive within a burst cycle of Bulk In/Out transaction.

(1-2) Upon successfully receiving the two network packets having MAC frames, the networking device determines whether the length (hereinafter referred as "L" value) of head of line (hereinafter abbreviated as HOL, also means the first network packet being received) in the buffer is less than the "B" value, if "L" value is less than "B" value, then sends the HOL directly up toward a host controller 27 of a client host connected thereto. Then, deduct "B" value by "L" value, which means the current Burst Credit is decreased by "L" bytes after transmitting the HOL. Every time when transmitting a network packet to the host controller 27, each of the network packet is appended with the proprietary bytes to delineate the boundary thereof in order to assemble the network packets being transmitted into a super-size network packet. Continue the above procedure for sequentially transmitting the network packets received in the buffer to the host controller 27 until the length ("L" value) of the currently received network packet in the buffer is greater than the currently remaining Burst Credit "B" value, then go to step (1-3). Note that during the period of transmitting the network packets received in the buffer to the host controller 27, there shall be no inter-frame gap in between two adjacent network packets, when there is no available network packet queuing in the buffer, then go to step (1-4).

(1-3) When "L" value is greater than currently remaining Burst Credit "B" value, stop the encapsulation process of assembling the network packets into a super-size network packet and prepare to conclude the transferring requested by the Bulk I/O request packet, and add a short packet to mark the end of a burst cycle of Bulk In/Out transaction.

(1-4) Wait for a short period of time and determine whether there is any potential network packet arriving in the buffer, if a network packet does arrive before timeout, go to step (1-2) to resume the encapsulation process of assembling the network packets into a super-size network packet; otherwise, stop the encapsulation process and prepare to conclude the transferring requested by the Bulk I/O request packet, and add a short packet to mark the end of a burst cycle of Bulk In/Out transaction.

Figure 5:
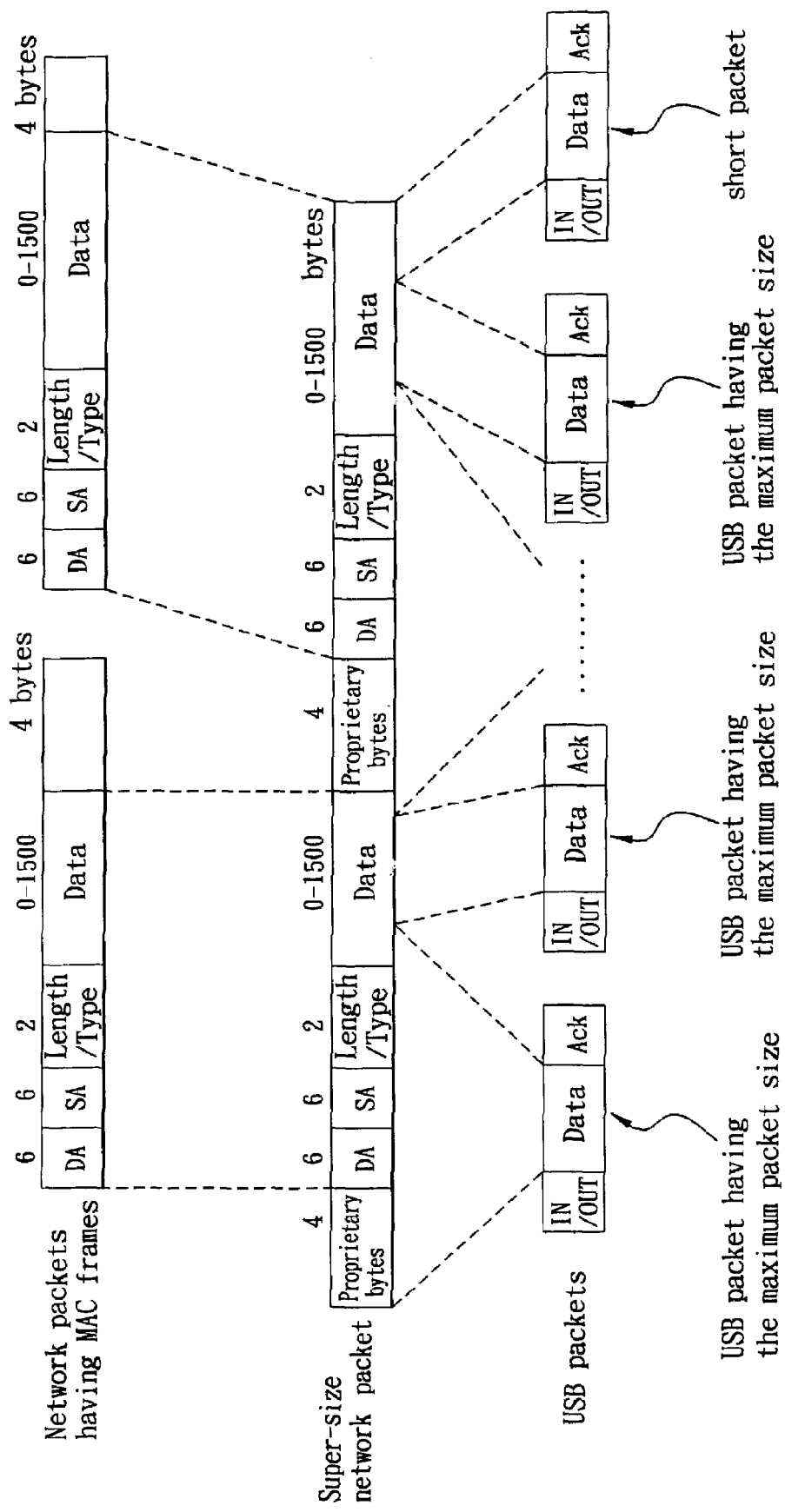
FIG. 5 presents schematically a network packet having MAC frame being transferred into a plurality of USB packets by utilizing the mechanism according to the present invention.

(2) When the network packet being transferred into USB packets is transmitted from the networking device, the mechanism comprises the steps of:

(2-1) The networking device mentioned in the following steps may be a network interface card compliant to USB interface specification and installed in a client host. A network software 24 installed in the client host first prepares and assembles a plurality of network packets (there are only two in FIG. 5) having MAC frames together, and appends the proprietary bytes to each of the network packets to delineate the boundary thereof and form a super size network packet. When the quantity of bytes of the network packets being transmitted is up to the "B" value predefined in the Burst Credit, the network software 24 then issue a Bulk Out I/O request packet to the USB Driver 25, enabling the USB Driver 25 to trigger a host controller 27 installed in the client host to complete the Bulk In/Out transaction over USB bus as requested. Whenever the quantity of bytes of the network packets being assembled by the client host is up to the "B" value predefined in the Burst Credit, repeat this step enabling the host controller 27 installed to complete the Bulk In/Out transaction over USB bus as requested.

(2-2) When the quantity of bytes of the network packets being transmitted is less than the "B" value predefined in the Burst Credit (usually happening near the end of the transfer session), the network software 24 shall send these network packets immediately through issuing one Bulk I/O request packet without waiting to transmit them until the quantity of bytes of the network packets received in the buffer is up to the "B" value predefined in the Burst Credit.

Summing up the above, the mechanism disclosed in the present invention is able to activate a networking device to assemble a plurality of Ethernet network packets having MAC frames together as a super-size network packet, and enable a network software 24 installed therein to issue a Bulk In/Out request packet to a USB driver to transmit the super-size network packet over the USB bus, which not only effectively avoid the software from issuing a long series of request packets while transmitting Bulk network packets, but also avoids the USB driver from wasting a lot of time due to processing a long series of queuing request packets, and greatly increase the throughput performance of the network packets over the USB bus.

While the invention has been described by means of specific embodiments, numerous modifications and variations could be made thereto by those skilled in the art without departing from the scope and spirit of the invention set forth in the claims.

What is claimed is:

1. A burst transfer mechanism of network packets having MAC frames over a USB bus in an Application Specific Integrated Circuit (ASIC) installed in a USB compliant networking device, which enables the networking device to proceed with the steps of:

when the networking device receives a Bulk I/O request packet, transmitting the Bulk I/O request packet to a USB driver installed therein;

enabling the USB driver to assemble a plurality of Ethernet packets having MAC frames together, append proprietary bytes to every Ethernet packet being received to delineate the end of each Ethernet packet, and form a super-size network packet;

transferring the super-size network packet into a plurality of USB packets having maximum packet size defined for the USB endpoint; and transmitting the USB packets out within a burst cycle of a Bulk In/Out transaction.

2. The mechanism of claim 1, wherein the proprietary bytes comprise the length and length bar (inversion of Length value) of the corresponding network Ethernet packets, wherein the length refers to the total quantity of bytes counting from the beginning of the destination address field to the end of data field, and is used to represent the ending position of each Ethernet packet being received and to delineate the boundary thereof.

3. The mechanism of claim 1, wherein, when the USB driver grants the request of the Bulk I/O request packet after receiving the Bulk I/O request packet, the mechanism proceeds with the capsulation process with respect to the super-size network packet, transferring the super-size network packet into a plurality of USB packets having maximum packet size defined for the USB endpoint along with a short packet and then, within the burst cycle of the Bulk In/Out transaction, transmitting the USB packets out.

4. The mechanism of claim 3, wherein, within the burst cycle of the Bulk In/Out transaction, the maximum quantity of the Ethernet packets having MAC frames to be included in a super-size network packet is predefined in a Burst Credit according to the quantity of the Ethernet packets having MAC frames currently queuing in a buffer installed in the networking device.

* * * * *